Sept. 4, 1951     E. G. SCHMIDT     2,567,032

ROTARY PLUG VALVE

Filed Jan. 16, 1946     2 Sheets-Sheet 1

Inventor:
Edward G. Schmidt
By Joseph O. Lange Atty.

Sept. 4, 1951  E. G. SCHMIDT  2,567,032
ROTARY PLUG VALVE
Filed Jan. 16, 1946  2 Sheets-Sheet 2

Inventor:
Edward G. Schmidt
By Joseph O. Lange Atty.

Patented Sept. 4, 1951

2,567,032

UNITED STATES PATENT OFFICE 2,567,032

ROTARY PLUG VALVE

Edward G. Schmidt, Western Springs, Ill., assignor to Crane Co., Chicago, Ill., a corporation of Illinois Application January 16, 1946, Serial No. 641,484

8 Claims. (Cl. 251—91)

This invention relates to valves, more particularly it pertains to a novel construction of rotary plug valves.

Specifically this invention contemplates a rotary plug valve in which a closure member is employed having expandible annular contact faces in which fluid pressure may be conveniently applied for effecting a fluid seal.

It is a further object of this invention to provide a simple and conveniently disposed piston arrangement whereby the expandible members can be expanded only in the open and closed positions of the valve.

A further object is to provide a novel valve construction in which the valve plug or closure member is locked against rotation until the piston and diaphragm pressure is released by a novel lever actuating mechanism comprising details hereinafter disclosed.

A still further important object is to provide a construction in which by a movement of the plunger, the expanding pressure is relieved positively before the closure member having the expandible element, may be rotated.

Another important object is to provide in a device of the character hereinafter described, means for supplying pressure to the expandible elements and relieving such pressure by means of cooperation with the actuating means.

Other objects and advantages will become more readily apparent in connection with a reading of the following specification in light of the accompanying drawings, in which Fig. 1 is a sectional assembly view of a valve in the open position and employing a preferred form of construction.

Figure 1:
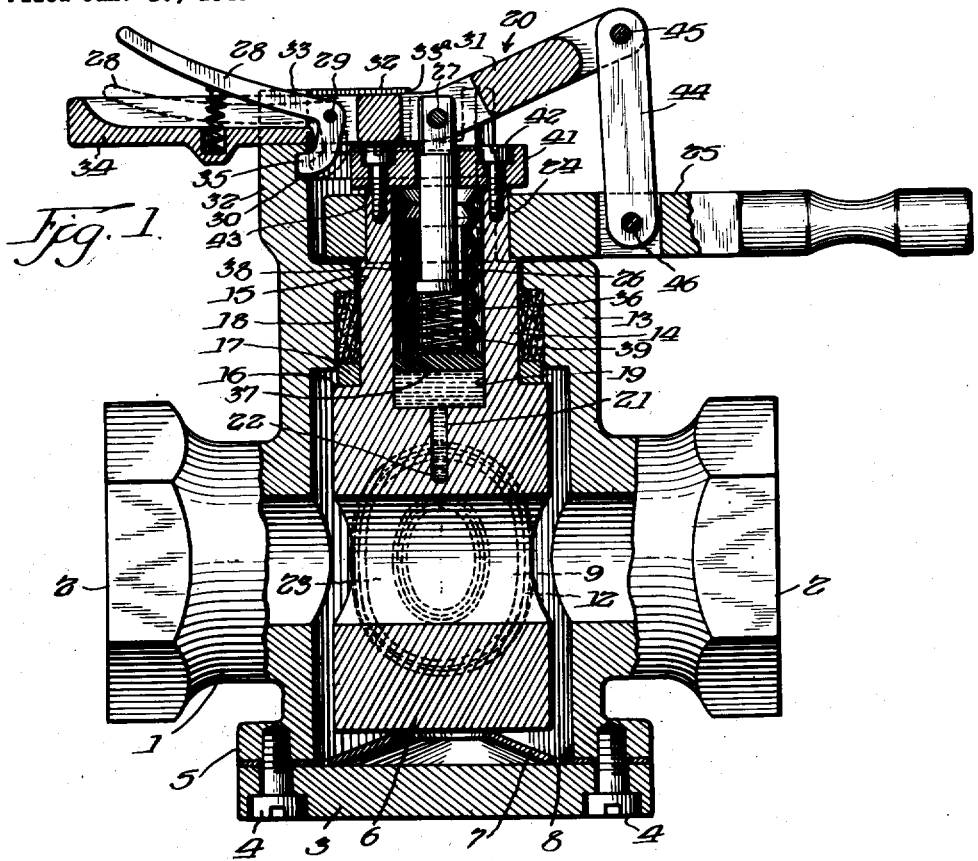

Referring now to Fig. 1, a conventional rotary valve body or casing 1 is shown having the usual pipe end connections 2 functioning as the inlets and outlets of the valve depending on the manner of installation, and having at the lower portion thereof, the removable cap 3 bolted as at 4 or connected by other suitable means, such as threads, with the lower portion of the body flange 5, functioning to hold or contain in suitable position, as hereinafter described in more detail, the rotary closure member generally designated 6 between the lower portion of the latter mentioned closure member and the upper surface of the cover 3. A supporting Belleville spring 7 is used for resiliently supporting the closure member 6 which as indicated is loosely received within the bore 8 in the body 1. The latter mentioned bore is suitably finished to provide leak-proof relation with the expandible annular members 9 and 11 which as indicated are placed between the ports of the plug or closure member. The members 9 and 11 may be made either of sheet-metal, leather, rubber, plastics or other compositions or materials depending upon the nature of the service for which the valve is intended, and suitably attached.

As indicated at 12, the expandible members 9 and 11 are preferably crimped, in order to allow for the desired expansion necessary to provide a leak-proof contact with the bore 8 of the body. Of course with certain types of materials as for example, if rubber were used, the crimping referred to may be dispensed with.

The upper portion of the body 1 is provided with the extension 13 thereof, which may be of cylindrical form, the shank portion 14 of the closure member projecting as indicated through the aperture or bore 15 so as to serve as a guide for the closure member and to provide a suitable lower container for packing hereinafter referred to.

Continuing with a description of a preferred form of my invention, the plug at the lower portion of the shank 14 is provided with a shoulder 16 supporting a packing washer 17 of a diameter suitable for reception within the packing chamber 18 for containing the desired packing such as braided asbestos or other material, depending again upon the character of the service for which the valve is intended.

Within a central portion of the shank 14, a cylindrical chamber 19 is provided functioning as a fluid chamber, the lower portion of the chamber having a fluid passage 21 connected therewith and extending downwardly to join with a transversely extending preferably diametrically positioned lubricant passage 22 which extends from one side of the plug to the other and as indicated in a level or plane to communicate with the chambers 23 formed by the concave surfaces of the annular rings 9 and 11.

At the upper limit of the shank 14 as indicated at 24 the latter is formed with a square or other polygonal extension to receive the handle or wrench thereon, generally designated 25; thus for purposes of actuation the wrench or lever 25 is in non-rotatable relation to the plug or closure member 6.

Figure 2:
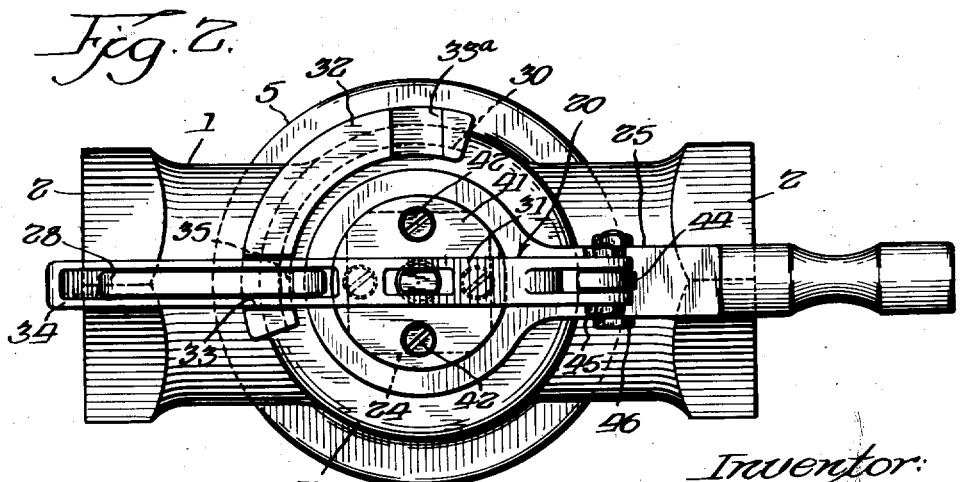
Fig. 2 is a plan elevation of the structure referred to in Fig. 1.
Figure 3:
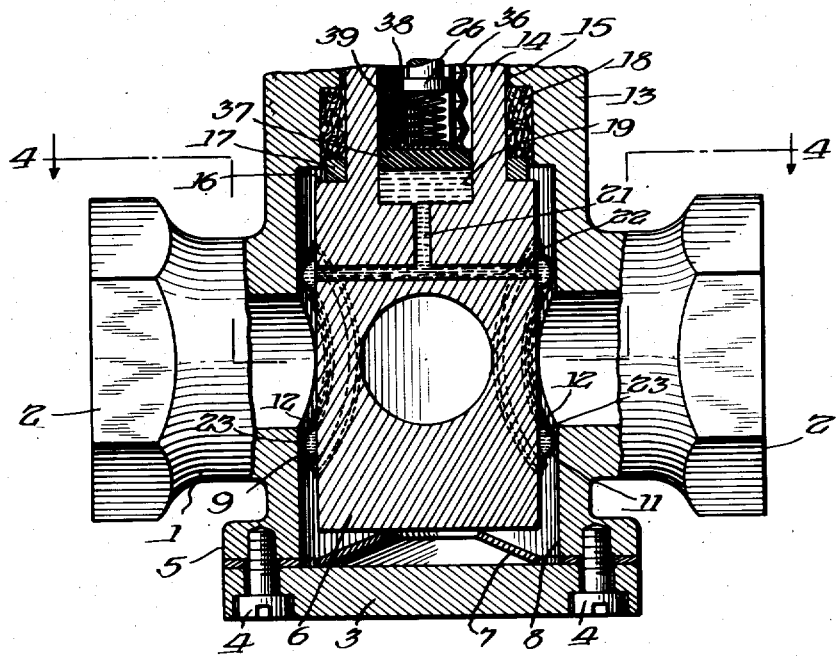
Fig. 3 is a sectional assembly view of a valve referred to in Fig. 1 in the closed position.
Figure 4:
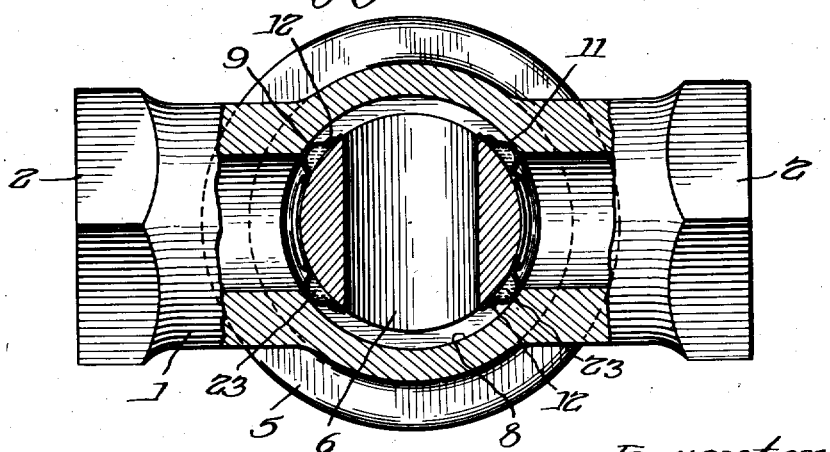
Fig. 4 is a sectional view taken on the line 4—4 of Fig. 3.

At this point in the description of my invention, it may be well to direct attention to the novel construction which provides that the piston 26 is pivotally attached as at 27 to a lever extension of the actuating handle 25, said lever extension being generally designated 20. The latter member is mounted non-rotatably relative to the piston 26 and also to the lever 25 by virtue of attachments referred to as 27, 44, 45, and 46. As indicated more clearly in Fig. 2 the extension 34 opposite the disposed extension 31 is hollow and channeled to receive the pivotally mounted locking lever 28, pivotally attached thereto as at 29. The locking lever 28 may be spring loaded as indicated. The angularly extending portion 31 of the lever 20 is suitably slotted as indicated to receive the piston pivotal connection 27. The purpose of such arrangement as hereinabove described will be more clearly apparent when it is understood that the extension 13 of the casing is provided with an arcuately extending portion 32 provided as indicated at 33 and 33a with slots to receive the lever extension 34 in the fully open or closed positions of the valve closure member. The hook 28 in the latter position of the valve, by means of the angular projection 35 prevents the lever 34 from being lifted above and beyond the slots 33, by means of the grip with the arcuate groove 30 of the extension 32. In the latter locked position the piston 26 is under load to create pressure within the fluid chamber 19 and to thereby cause inflation or expansion of the expandible members 9 and 11.

In order to allow for the desired reciprocable movement of the piston 26 in building up pressure within the chamber 19, a bellows 36 is used having integral therewith at its lower portion, a plunger enlargement 37 fitting relatively snugly within the chamber 19.

Interposed between an end portion of the piston 26 and the upper surface of the plunger member 37 is the coiled spring 39, the spring being contained within the annular member 38, within which the piston 26 is movable. The purpose of the spring is to maintain fluid pressure in the chambers 23 regardless of expansion or contraction of the fluid due to temperature changes.

The bellows 36, is formed with an annular flange 43, the latter member is clamped against the upper surface portion of the shank 14 by means of the flange or ring member 41, the latter being held to the upper surface of the shank by means of the machine screws 42, thus the flange member 41 serves two purposes, first to clamp the bellows 36 in position and second to retain the operating lever 25 upon the polygonal shank 24 against removal.

The combined linkage between the piston 26 and the handle 25 provides for the lever 20 being supported on the fulcrum lever 44 by means of the pivotal pin 45, the lever 44 being mounted within the wrench handle or lever 25 by means of the pivotal connection at 46.

To operate the valve from the open and seated position as shown, the latching lever 28 is first moved to the position indicated in dotted lines, which thus permits the lever 34 to be lifted upward above the slot 33, and by reason of withdrawal of the piston 26 to an upwardly movable position, the fluid pressure within the chamber 19 will be relieved causing the members 9 and 11 to collapse, at which stage the closure member 6 is ready for rotation to the closed position. Rotation of the plug 6 and lever 34 is accomplished by means of the lever 25. When the closed position is reached, the lever 34 is in alignment with the slot 33a and depression of the lever into said slot forces the piston 26 downward against the spring 39 to actuate the piston 37 and compress the fluid within the chamber 19, thereby inflating the members 9 and 11 as to form a seal against bore 8 between the ports of the body and the closure member. At this stage in order to maintain pressure substantially constant within the chamber 19 the latch lever 28 is then placed in the hooked and locked position as indicated in the solid lines.

While only a single embodiment has been shown in presenting this invention, this has been done for reason of setting forth an example which is illustrative of its application. It will therefore be apparent to those skilled in the art that the construction is susceptible of numerous modifications falling within the spirit of the invention and the scope of the appended claims.

I claim:

1. In a rotary valve, the combination including a valve body with inlet and outlet ports, a closure member rotatably mounted in the said body provided with a port arranged to cooperate with said body ports so that in one position of said closure the ports of said body and closure are in communication and in another position communication is cut off, actuating means for said closure member, the said closure member having annular expandible and contractable means thereon arranged on predetermined expansion to effect a sealing contact with the said body, the expandible means being so located on the closure as to form sealing means around the inlet and outlet ports when expanded and the closure is in port closing position, means cooperating with the said closure member for expanding and contracting the said expandible means, the said latter cooperating means being so constructed and arranged that it may be operated to effect expansion of the expandible means when the actuating means is located in positions of full valve opening or complete valve closure but is rendered incapable of expansion operation in all other positions of the valve actuating means.

2. A rotary valve, the combination including a valve body with inlet and outlet ports, a closure member rotatably mounted within the said body provided with a port arranged to cooperate with said body ports so that in one position of said closure the ports of said body and closure are in communication and in another position communication is cut off, the said closure member having annular expandible and contractible members mounted thereon diametrically opposed for fluid sealing cooperation with the said body and arranged on predetermined expansion to effect a sealing contact with the said body, the said body having a substantially cylindrical bore for reception of the closure member and engagement by the said expandible and contractible members, the expandible and contractible members being so located on the closure as to form sealing means around the inlet and outlet ports when expanded and the closure is in port closing position, the closure member having lever actuated plunger means for inflating the said expandible members, means on the said body cooperating with means on the said lever actuated plunger means for maintaining the said inflating means in substantially immovable position upon predetermined rotation of the said closure member, means for predeterminedly effecting rotation of the said closure member, the said plunger means being engageable with said body at certain limits of rotation of the said closure member to restrain the latter member against rotation while inflating the said expandible and contractible members.

3. A rotary valve comprising a body having inlet and outlet ports, a closure member rotatably mounted within the said body provided with a port arranged to cooperate with said body ports so that in one position of said closure the ports of said body and closure are in communication and in another position communication is cut off, a stem portion on the closure member, packing means within the said body for the said closure member, the said closure member having flexible expandible and contractible means on separate face portions arranged on predetermined expansion to effect a sealing contact with the said body, the said closure member having a central bore, means for supplying fluid under pressure to the expandible and contractible means of the closure member whereby inflation of each of the expandible and contractible means is effected, the said closure member having communicating passageways from each of said expandible and contractible means to said central bore, the expandible and contractible means being so located on the closure as to form sealing means around the inlet and outlet ports when expanded and the closure is in port closing position, the said stem portion having a central passage in communication with a bore in the said closure member, actuating means for rotating the said closure member, the said means for supplying fluid under pressure comprising a reciprocably movable member within the said stem portion including a resiliently mounted piston also movable within the said stem portion, the said piston member being pivotally movable relative to the said closure member, the said actuating means cooperating with the said closure member to effect said pivoted support of the said piston member.

4. A rotary valve of the character described, a casing having inlet and outlet ports, a substantially cylindrical seat chamber in the said casing, a closure member rotatably mounted within the said casing, resilient means within the cylindrical chamber casing for holding the said closure member against substantial vertical movement, packing means at the upper portion of the seat chamber compressible by the said resilient means, the said closure member having a passage for registry with a passage in the said casing in the open position of the closure member, an inflatable expandible and collapsible fluid-tight annular seat member positioned on a peripheral surface of the closure member on each side of the passage of the closure member, actuating means therefor including means for forcing fluid under pressure to inflate each expandible and collapsible seat member, the latter seat members allowing for the collapse thereof relative to the closure member by withdrawal of fluid pressure, the expandible and collapsible seat members being so constructed and arranged as to create fluid tight seals around the ports of the casing when expanded between the closure member and the seat chamber in the said casing in the closed position of the said closure member, actuating means cooperating with the said casing whereby inflation of the said annular expandible and collapsible seat members is relieved before rotation of the said closure member can be effected, the said actuating means including a lever and a plunger pivotally depending therefrom, the said casing having stop means for preventing rotation of said closure member when fluid pressure under the influence of the plunger is directed to each expandible and collapsible seat member to expand the latter.

5. A rotary valve of the character described comprising a body having inlet and outlet ports, a curvilinear seat in the said body, a cylindrical closure member rotatably mounted within the said body provided with a port arranged to cooperate with said body ports so that in one position of said closure the ports of said body and closure are in communication and in another position communication is cut off, the said closure member being in spaced-apart relation to the curvilinear seat, resilient means within the body for the said closure member whereby substantial vertical movement of the said closure member is restrained, the said closure member having inflatable expandible and collapsible seats on its periphery for predetermined contact with said body curvilinear seat, the said seats being so located on the closure as to form sealing means around the inlet and outlet ports of the said body when inflated and the closure member is in port closing position, piston means within the said closure member for forcing a fluid under pressure to said inflatable expandible and collapsible seats, whereby the resultant inflation and expansion of said latter seats creates a fluid-tight seal contact between the said closure member and the curvilinear seat in the said casing, actuating means for the closure member including lever means having a plurality of pivotally mounted levers thereon, one of said latter levers cooperating with the said piston means to actuate the latter member, means on said body cooperating with said one lever preventing operation of said piston means an amount sufficient to effect a sealing action of the inflatable seats except in full opening or full closing position of said closure member, the other lever being constructed and arranged to cooperate with said one lever and a relieved portion of said body to releasably retain said one lever in a position corresponding to a sealing condition of said inflatable seats whereby sealing inflation of said expandible and collapsible seats is only possible on a rotation of said closure member to full open or full closed position.

6. A rotary valve including a valve body having a cylindrical bore with an inlet thereto and an outlet therefrom, a closure member having a port therethrough arranged on rotation to different positions to cooperate with the inlet and outlet ports to effect full opening, partial opening or closure of said inlet and outlet ports, the said closure member having at least one annular expandible and contractible means thereon arranged when expanded to be in fluid sealing contact with said cylindrical bore, the expandible and contractible means being so located on the closure as to form sealing means around at least one of the body ports when inflated with the closure member in port closing position, actuating means including an operating member for effecting rotation of the closure member, means for inflating and deflating said expandible and contractible means, said operating means coacting with said inflating and deflating means for effecting operation thereof, means on said valve body arranged to prevent operation of said operating means to inflate said expandible and contractible means except when said actuating means has positioned the valve closure member to full open or full closed positions, and means associated with said actuating means and cooperating with said body member to releasably lock said closure member against rotation when in its full open or closed positions.

7. In a rotary valve combination including a valve body with inlet and outlet ports, a closure member rotatably mounted in the said body provided with a port arranged to cooperate with said body ports so that in one position of said closure the ports of said body and closure are in communication and in another position communication is cut off, the said closure member having annular expandible and collapsible means cooperating therewith arranged on predetermined expansion thereof to effect a fluid sealing relation with the said body, the expandible and collapsible means being so located on the closure as to form sealing means around the inlet and outlet ports when expanded with the closure in port closing position, fluid means communicating with said expandible and collapsible means constructed and arranged upon movement in one direction to supply fluid to and on movement in the opposite direction to withdraw fluid from said expandible and collapsible means, lever means so associated with said closure member that on rotation thereof the closure member will be rotated and on pivotal movement thereof movement of said fluid means will be effected, said body having means thereon arranged to coact with said lever means to prevent pivotal movement of said lever means in a direction effecting movement of said fluid means to supply fluid to said expandible and collapsible means in all positions of said closure member other than its closed or full open positions.

8. In a rotary valve combination including a valve body with inlet and outlet ports, a substantially cylindrical closure member rotatably mounted in the said body and provided with a port arranged to cooperate with said body ports so that in one position of said closure the ports of said body and closure are in communication and in another position communication is cut off, the said closure member having expandible and contractible means thereon arranged to be expanded into sealing relation with said body, the expandible means being so related on the closure as to form, when expanded, sealing means around the inlet and outlet ports when the closure is in port closing position, fluid means arranged upon actuation to supply fluid to or release fluid from said expandible and contractible means, combined rotatable and pivotally movable means for selectively actuating the said fluid means and rotating the said closure member, the said combined rotatable and pivotally movable means being so constructed and arranged that said combined means may be operated to effect expansion of the expandible and contractible means when the said combined movable means is positioned to effect full valve opening or complete valve closure but is inoperative to permit expansion of the expandible means in all other rotative positions of the said cylindrical closure member.

EDWARD G. SCHMIDT.

REFERENCES CITED

The following references are of record in the file of this patent:

UNITED STATES PATENTS

| Number | Name | Date |
| --- | --- | --- |
| 1,472,573 | Warner | Oct. 30, 1923 |
| 1,872,417 | Dalldorf | Oct. 30, 1932 |
| 1,957,807 | Robinson | May 8, 1934 |
| 2,114,789 | Urquhart | Apr. 19, 1938 |
| 2,280,549 | Smickle | Apr. 21, 1942 |
| 2,325,802 | Schmidt | Aug. 3, 1943 |

Certificate of Correction

Patent No. 2,567,032 September 4, 1951

EDWARD G. SCHMIDT

It is hereby certified that error appears in the printed specification of the above numbered patent requiring correction as follows:

Column 8, line 9, for "related" read *located*;

and that the said Letters Patent should be read as corrected above, so that the same may conform to the record of the case in the Patent Office.

Signed and sealed this 13th day of November, A. D. 1951.

[SEAL]

THOMAS F. MURPHY,
*Assistant Commissioner of Patents.*